United States Patent [19]

Terada et al.

[11] Patent Number: 5,798,634
[45] Date of Patent: Aug. 25, 1998

[54] LOAD MANAGEMENT AND CONTROL APPARATUS

[75] Inventors: Makoto Terada; Isao Iyoda. both of Tokyo; Yoshiyuki Kobayashi; Akifumi Iwamaru. both of Hyogo, all of Japan

[73] Assignee: Mitsubishi Denki Kabushiki Kaisha. Tokyo, Japan

[21] Appl. No.: 845,432

[22] Filed: Apr. 25, 1997

Related U.S. Application Data

[63] Continuation of Ser. No. 428,638, Apr. 25, 1995, abandoned.

[30] Foreign Application Priority Data

Sep. 30, 1994 [JP] Japan ................. 6-237914

[51] Int. Cl.⁶ .................. G05F 1/70; G05F 1/14
[52] U.S. Cl. ............. 323/207; 323/210; 323/255
[58] Field of Search ................. 323/205, 206, 323/207, 210, 211, 255, 258

[56] References Cited

U.S. PATENT DOCUMENTS

| | | | |
|---|---|---|---|
| 4,752,726 | 6/1988 | Aoyama | 323/207 |
| 4,755,738 | 7/1988 | Shimamura et al. | 323/210 |
| 4,812,669 | 3/1989 | Takeda et al. | 307/105 |
| 5,136,233 | 8/1992 | Klinkenberg et al. | 323/343 |
| 5,349,522 | 9/1994 | Konishi et al. | 363/95 |
| 5,402,057 | 3/1995 | D'Aquila et al. | 323/211 |
| 5,422,561 | 6/1995 | Williams et al. | 323/209 |
| 5,428,551 | 6/1995 | Trainor et al. | 364/483 |

FOREIGN PATENT DOCUMENTS

| | | |
|---|---|---|
| 59-136822 | 8/1984 | Japan. |
| 3056035 | 3/1991 | Japan. |
| 5019873 | 1/1993 | Japan. |
| 5064373 | 3/1993 | Japan. |
| 8807655 | 10/1988 | WIPO. |

*Primary Examiner*—Peter S. Wong
*Assistant Examiner*—Bao Q. Vu
*Attorney, Agent, or Firm*—Rothwell, Figg, Ernst & Kurz

[57] ABSTRACT

A load management and control apparatus comprising a control unit in which system voltage and a power flow state are measured to make an arithmetic decision by using the resultant variations in voltage and reactive power so as to estimate system reactance, and the estimated system reactance is used to carry out control operation while establishing unique relationship between tap changing operation of the transformer and connection or disconnection of the reactive power supply unit in the receiving side sub-station so as to set voltage and power factor of the receiving side of power system in desired ranges, whereby in a receiving end side substation, it is possible to prevent frequent tap changing operation of the transformer, and adjust system voltage not only to reduce the voltage deviation but also to provide integrated and reasonable management of the reactive power.

3 Claims, 12 Drawing Sheets

LOAD MANAGEMENT AND CONTROL APPARATUS

This is a continuation of application Ser. No. 08/428,638, filed Apr. 25, 1995, now abandoned.

BACKGROUND OF THE INVENTION

1. Field of the Invention

The present invention relates to a load management and control apparatus used to operate an electric power system while maintaining a voltage of the electric power system at an appropriate value in the utilities, or other industrial companies and corporations having a non-utility generating equipment, and more particularly to a load management and control apparatus to adjust a tap of a transformer having a tap changer and concurrently control a reactive power supply unit such as power-factor correction capacitors in the vicinity thereof, and to eliminate pumping out of higher harmonics from the load into the utility power system.

2. Description of the Prior Art

In the prior art, in order to adjust and control voltage of a transmission and distribution system, almost all the load management and control apparatus connected to transformers having tap changers and voltage adjusting relay to measure and detect a voltage and its change of the electric power system so as to adjust the voltage of the system at an appropriate value in such a way that the voltage adjusting relay detects the voltage deviation from a reference value and changes tap position of the tap changing transformer.

On the other hand, the voltage of the system may momentarily fluctuate and may immediately return to an original voltage value. In such a case, if the tap of the transformer is changed as described above, the voltage of the system may adversely fluctuate. Hence, in the prior art, a proper relationship is established between an amount of voltage deviation ΔV and an operating time delay T of adjusting relay, as shown in FIG. 1. According to the relationship, even when the amount of voltage deviation ΔV increases, no adjustment is made to the tap of the transformer until the deviation continues for a certain lapse of time. However, even when such a control characteristic is provided, the number of times of tap changer operation increases in case the voltage deviation frequently occurs in the system causing the moving position comprising the tap changer of the transformer being operated frequently thus resulting in a reduced mechanical lifetime. Therefore, in the real operation, the number of times of the tap changing operation a day is kept to a predetermined number of times or less, and the tap is locked when the number of operation of the tap reaches the predetermined number so as to inhibit a subsequent operation. However, such a restriction is inapposite to the purpose of installation of the apparatus and can not be employed as a basic solution.

In the prior art load management and control apparatus also, a phase correction capacitor is connected to the system, however, it is connected not to adjust power factor of load constantly but to simply improve the power factor of load. Therefore, when control is made for connection or disconnection of the capacitor to or from the system, the power factor of the load may be improved, however, the constant power factor of the load can not be maintained.

In recent years, new type of converters are frequently employed as to finely shape a waveform of power supplied to the load by utilizing switching operation of power semiconductors. From these converters, higher harmonics are generated. The higher harmonic current contributes as a current source to be pumped up to the power distribution system of the utilities. Additionally, in order to estimate a state of the higher harmonics distribution for the purpose of suppressing the higher harmonics, it is necessary to grasp a state of a current distribution of both a current flowing into the system side and a current flowing into load side connected in parallel with the system. To actually grasp the state of the currents, however, is difficult. Invasion of the higher harmonics significantly cause faults such as damage to the power factor adjusting capacitor. Thus, higher harmonics problems are now in scope of regulation.

As set forth as above, in the prior art, the voltage of the system is controlled by the changing over operation of the tap of the transformer, however, there are the following problems. That is, it is impossible to accurately recognize to what extent the voltage of the system is adjusted when the connection and the disconnection of the reactive power supply unit are carried out without the consideration to the effect of reactance of the system. Hence, a trial-and-error method should be employed for the connection and the disconnection of the volt-ampere reactive (var) supply equipment, and for the changing over operation of the tap of the transformer.

Further, as known widely, there is means for maintaining the constant power factor of the system. This means is controlled independent of adjustment of the voltage by tap-changer. In addition, in this practice, there is provided no means for detecting the higher harmonics. Therefore, there are problems in that the operation of management and control can not automatically be changed in accordance with the coupling of the load and the system, and the voltage of the system can not always be maintained and managed at an appropriate value.

SUMMARY OF THE INVENTION

In order to overcome the above problems, it is an object of the present invention to provide a load management and control apparatus in which frequent changing operation of a tap changer can be prevented, and adjustment of system voltage is carried out not only to keep voltage deviation within limit but also to provide overall and rational management for supply of reactive power of a system.

It is another object of the present invention to provide a load management and control apparatus in which the influence of higher harmonic pumped up from loads upon the system can be suppressed and controlled.

To attain the above objects, according to one aspect of the present invention, there is provided a load management and control apparatus including a control unit in which, in addition to the detection of the system voltage, active power and reactive power are detected, and then, the system voltage and power flow state are varied depending upon closing or opening of reactive power supply unit. Further, by using the resultant variations of the voltage and the reactive power, arithmetic operation is made to estimate system side reactance. The estimated system reactance is used to carry out control operation while integrating tap changing operation of a tap changer and closing/opening operation of the reactive power supply unit so as to keep voltage and power factor of a receiving side system within the desired ranges.

As stated above, in the load management and control apparatus according to the first aspect of the present invention, the system reactance is estimated by using the variations in the voltage and that of the reactive power of the system. The estimated system reactance is used to carry out the control operation while integrating the tap changing operation of the tap changer and the closing/opening operation of the reactive power supply unit so as to keep the voltage and the power factor of the receiving end of the system within the desired ranges. As a result, it is possible to prevent the frequent operation of the tap changer, and adjust voltage of a power system not only to overcome voltage deviation but also to provide overall and rational management, including power-factor improvement, for supply and transportation of the reactive power of the power system.

According to the second aspect of the present invention, there is provided a load management and control apparatus including a control unit in which, in addition to the detection of a system voltage, the active power and the reactive power are detected to monitor and detect variations in the active power, the reactive power, and the voltage. Further, an arithmetic operation is made by using the variations to estimate system impedance. The estimated system impedance is used to confirm variations in system properties, thereafter carrying out control operation with integrating tap changing operation of the LRT transformer and opening/ closing operation of a reactive power supply unit so as to establish a desired relationship between the voltage, the active power, and the reactive power of a receiving end side of the power system.

As stated above, according to the second aspect of the present invention, the system impedance is estimated by using the variations in the voltage, the active power, and the reactive power of the system. The estimated system impedance is used to carry out the control operation with integrating the tap changing operation of the LRT transformer and the opening/closing operation of the reactive power supply unit so as to provide the desired relationship between the voltage, the active power, and the reactive power of the receiving side of power system. As a result, there are effects in that frequent changing operation of the tap can be prevented, and the voltage of the power system is adjusted not only to reduce voltage deviation but also to provide overall and rational management for supply and dispatching of the reactive power of the power system while predicting voltage deviation depending upon load fluctuation according to time-varying system capacity, that is, short-circuit capacity.

According to the third aspect of the present invention, there is provided a load management and control apparatus including a control unit in which higher harmonic voltages or currents on both the system side and the load side are measured or monitored, and the system short-circuit capacity is compared with the magnitude of a load power flow by using the system reactance or system impedance estimated in the first or second aspect. Further, it is possible to automatically set a suppression level of the higher harmonics of a current system, and to send, externally to the apparatus, information on the conditions or the operation command to activate an adjacent higher harmonic suppression apparatus, an adjacent reactive power supply unit, and so forth.

As stated above, according to the third aspect of the present invention, by using the system reactance or the system impedance estimated in the first or second aspect of the present invention, the alarm signal is triggered to provide the information on the activation of the higher harmonics suppressing apparatus and the reactive power supply unit. As a result, it is possible to control and manage the effect of the higher harmonics upon the system operation.

The above and further objects and novel features of the invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Embodiment 1

An embodiment of the present invention will now be described referring to the accompanying drawings. Prior to a specific description, an examination is made to a basic relationship between the voltage and the reactive power at the load end of the system.

Figure 1:
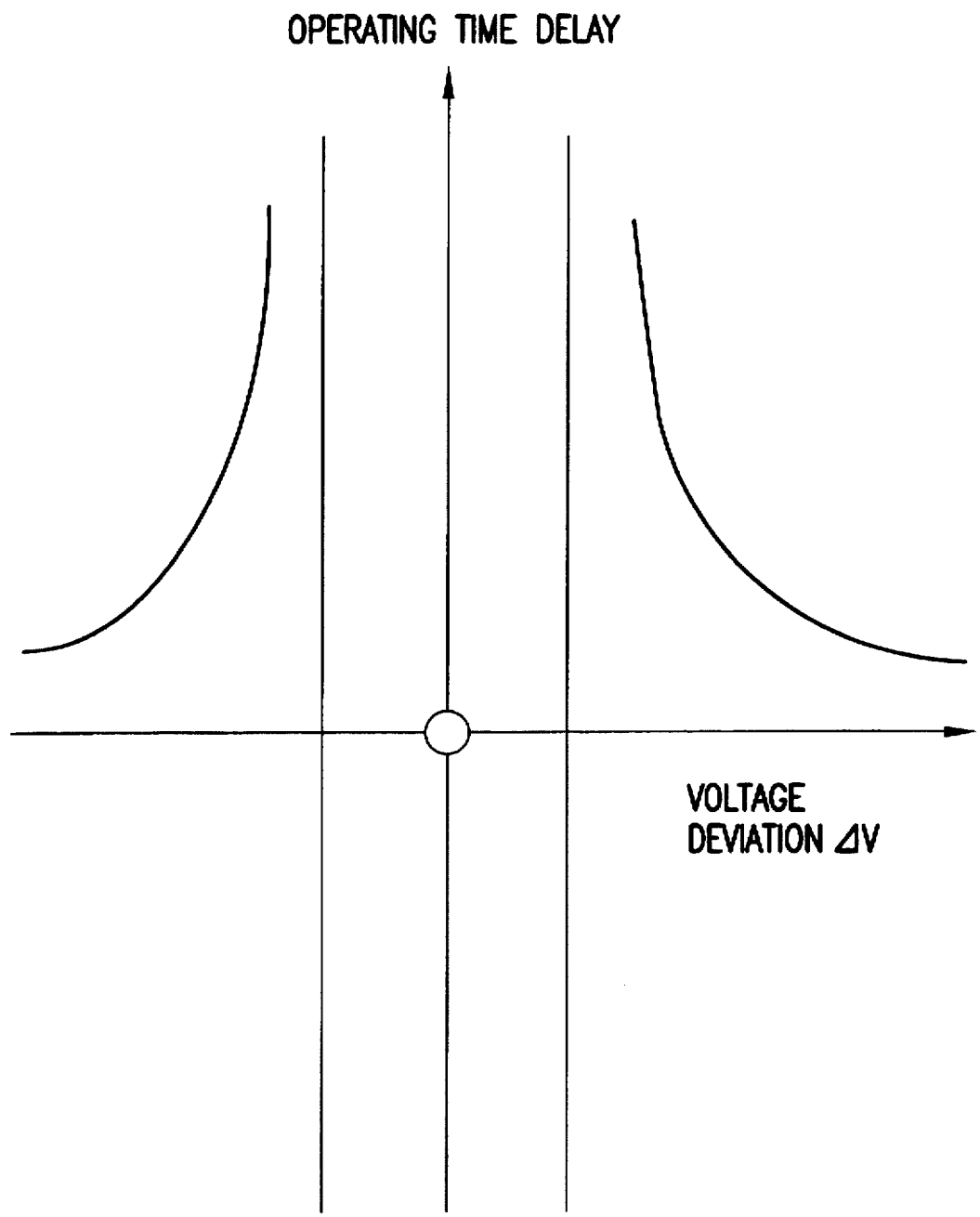
FIG. 1 is an operating time characteristics of a conventional voltage adjusting relay.
Figure 2:
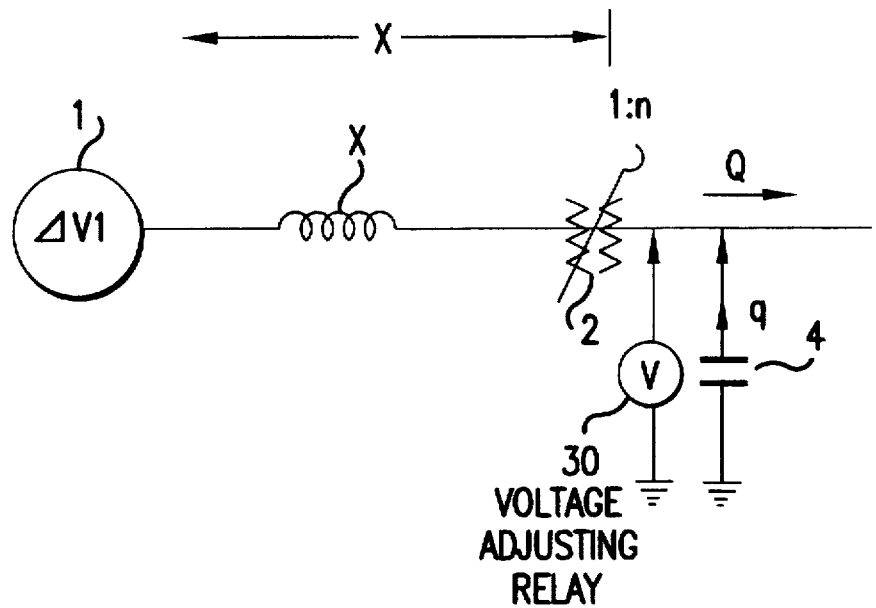
FIG. 2 is a one-line diagram of the model system which is a subject of the present invention.
Figure 3:
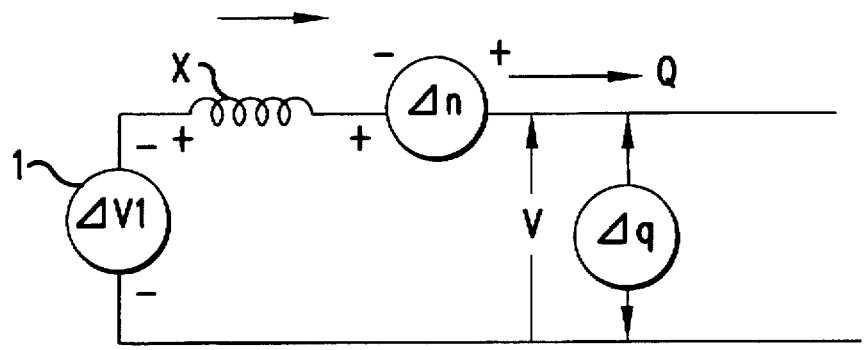
FIG. 3 is an equivalent circuit to FIG. 2.

FIG. 2 is one-line diagram of the model system comprising the back power source 1, and the system including a voltage adjusting relay 30 and a transformer 2 having a tap changer disposed on the load end side of the system. FIG. 3 is an equivalent circuit diagram of FIG. 2. The tap changer having a turn ratio of 1:n is provided for the transformer 2. When a variation $\Delta n$ is generated by a tap change of the tap changer and a variation $\Delta q$ in reactive power q by a switching operation of a capacitor 4, the following relationships are established.

$$\Delta V = \Delta V_1 + \Delta n - X \cdot \Delta q \quad (3.1)$$

$$\Delta Q = -\Delta q \quad (3.2)$$

From the above relationships, the variation of the tap ($\Delta n$) serves to vary only the voltage, and the variation $\Delta q$ in the reactive power supply causes change to improve the power factor, resulting in a variation of the voltage. Therefore, it can be seen that the system reactance X can define the relationship between the variation in the voltage ($\Delta V$) and the variation in the power factor, caused by the voltage variation $\Delta V_1$ occurring in the voltage behind the source reactance X, even when there are no operation of the taps and var supply.

Figure 4:
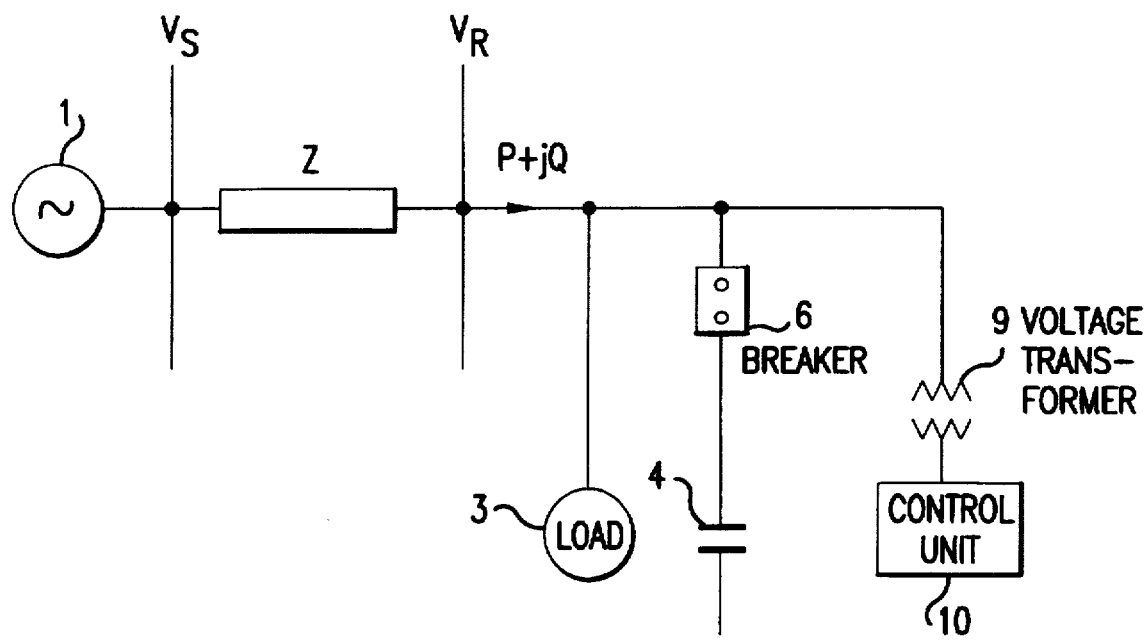
FIG. 4 is another one-line diagram of the model system which is a subject of the present invention.

A further examination is made to the phenomenon in case system element values at the sending end and the receiving end of the system are set as shown in FIG. 4. When the receiving end receives power W (=P+jQ) from the single power source 1, the following equation can be obtained:

$$V_S^2 = V_R^2 + 2(rP + xQ) + \frac{(r^2 + x^2)(P^2 + Q^2)}{V_R^2} \quad (3.3)$$

where $V_S$ and $V_R$ respectively show sending end voltage and receiving end voltage; and Z (=r+jX) is a system impedance connecting the sending end and the receiving end.

From the above expression, $$\frac{V_S^2 - V_R^2}{W^2} = \left(r + \frac{PV_R^2}{W^2}\right)^2 + \left(x + \frac{QV_R^2}{W^2}\right)^2 \quad (3.4)$$

Figure 5:
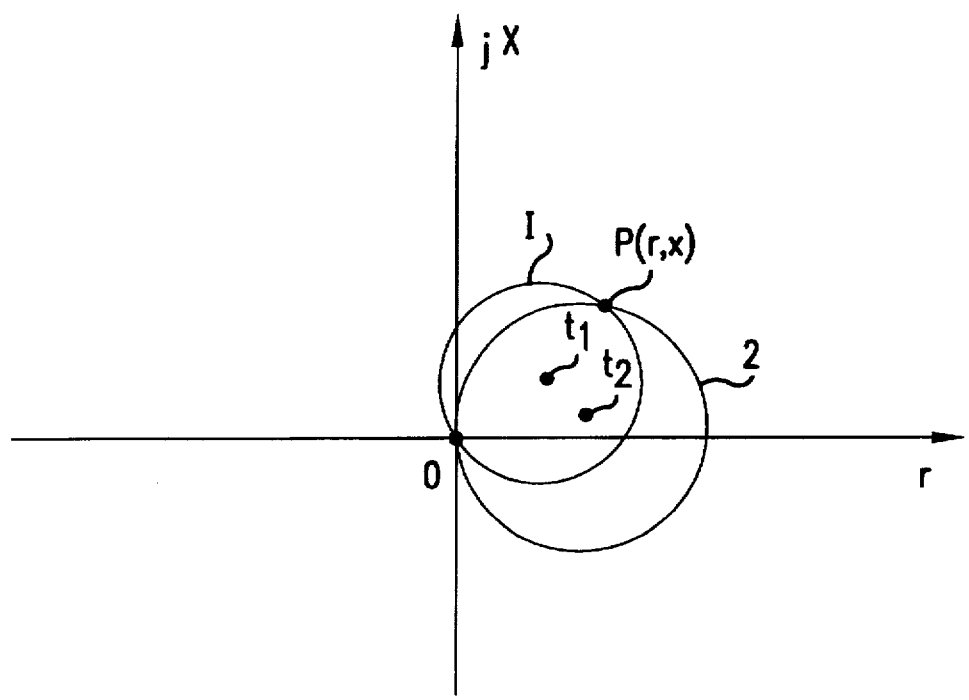
FIG. 5 is a diagram for the solving of system impedance in the subject system of FIG. 4.

The above expression is similar to an expression used in the well-known power circle diagram. When the system impedance Z (=r+jX) is ever regarded as a variable, as shown in FIG. 5, it is possible to describe circles having radius of $V_S*V_R/W$ to intersect at the origin on the r–Jx plane.

In general, the power at the receiving end varies with time according to the variation of the load. Consequently, it is possible to draw corresponding to two time points $t_1$ and $t_2$, two circles having different centers and the different radii to intersect at the origin. The system impedance Z (=r+jX) is given by the intersection of the two circles probably in the first or fourth quadrant. With r and X given by the intersection, the voltage at the sending end can easily be found according to the expression by using the voltage, the active power, and the reactive power which are known in advance. That is, it is possible to find the impedance viewed the power source side of the system from the receiving end and the voltage at the sending end by finding two sets of values measured at different time points $t_1$, $t_2$, of the voltage, the active power, and the reactive power at the receiving end. In this case, there is no approximation in solution so that the exact solution of r nd X can be obtained as long as the impedance of the system is kept constant.

A description will now be given of management and suppression of higher harmonics. In recent years, there have been discussed topics of, for example, damages to equipments due to the higher harmonics mainly generated from the loads in distribution systems. Many of higher harmonics are generated from a semiconductor converter to which a power semiconductor is applied such as thyristor, or transistor. However, mechanisms of the higher harmonic generation have already been clarified, and concrete guidelines for suppressing the higher harmonic have been proposed. The guidelines for higher harmonics suppression include the related standards published by Institute of Electrical and Electronics Engineers (IEEE) which has been studying the problem early on. One of the related standards is the following standard advanced jointly by Power Engineering Society and Industry Applications Society: "IEEE Recommended practices and Requirements for Harmonic Control in Electrical Power Systems, IEEE. STD. 519-1992, old version; IEEE. STD. 519-1981."

In the above document which has been recently published, current distortion limits in a consumer connected to the utility distribution system are reported as follows: IEEE.STD.519-1992

TABLE 10.3

Current Distortion Limits for General Distribution Systems
(120 V Through 69000 V)
Maximum Harmonic Current Distortion
in Percent of $I_L$
Individual Harmonic Order (Odd Harmonics)

| $I_{SC}/I_L$ | <11 | 11≦h<17 | 17≦h<23 | 23≦h<35 | 35≦h | TDD |
|---|---|---|---|---|---|---|
| <20* | 4.0 | 2.0 | 1.5 | 0.6 | 0.3 | 5.0 |
| 20<50 | 7.0 | 3.5 | 2.5 | 1.0 | 0.5 | 8.0 |
| 50<100 | 10.0 | 4.5 | 4.0 | 1.5 | 0.7 | 12.0 |
| 100<1000 | 12.0 | 5.5 | 5.0 | 2.0 | 1.0 | 15.0 |
| >1000 | 15.0 | 7.0 | 6.0 | 2.5 | 1.4 | 20.0 |

Even harmonics are limited to 25% of the odd harmonic limits above.
Current distortions that result in a dc offset, e.g., half-wave converters, are not allowed.
*All power generation equipment is limited to these values of current distortion, regardless of actual $I_{SC}/I_L$.
where
$I_{SC}$ = maximum short-circuit current at PCC.
$I_L$ = maximum demand load current (fundamental frequency component) at PCC.

Further, the following limit is given as the standard to voltage distortion causing the above-mentioned current distortion.
IEEE.STD.519-1992

TABLE 10.1

Basis for Harmonic Current Limits

| SCR at PCC | Maximum Individual Frequency Voltage Harmonic (%) | Related Assumption |
|---|---|---|
| 10 | 2.5–3.0% | Dedicated system |
| 20 | 2.0–2.5% | 1–2 large customers |
| 50 | 1.0–1.5% | A few relatively large customers |
| 100 | 0.5–1.0% | 5–20 medium size customers |
| 1000 | 0.05–0.10% | Many small customers |

The above-mentioned two Tables mean that allowable higher harmonics current increases along with an increase of the short-circuit current of the system. That is, when the load of consumer is connected to the rural distribution system having smaller short-circuit capacity, it is necessary to strictly limit the higher harmonics current distortion. Namely, for rational reduction of the higher harmonics, an allowable value for the higher harmonics must be varied according to the ratio of the short-circuit capacity of the system to the load side capacity viewed from the point of connection (Pcc) with the system and the load.

To summarize the above understandings, for the reasonable management of higher harmonics voltage at the point of connection with the system and load, it is essential to grasp, in addition to its own load, to what extent the point is loosely or tightly coupled to the system so as to improve the power factor and reduce the higher harmonics if ever they exist.

Figure 6:
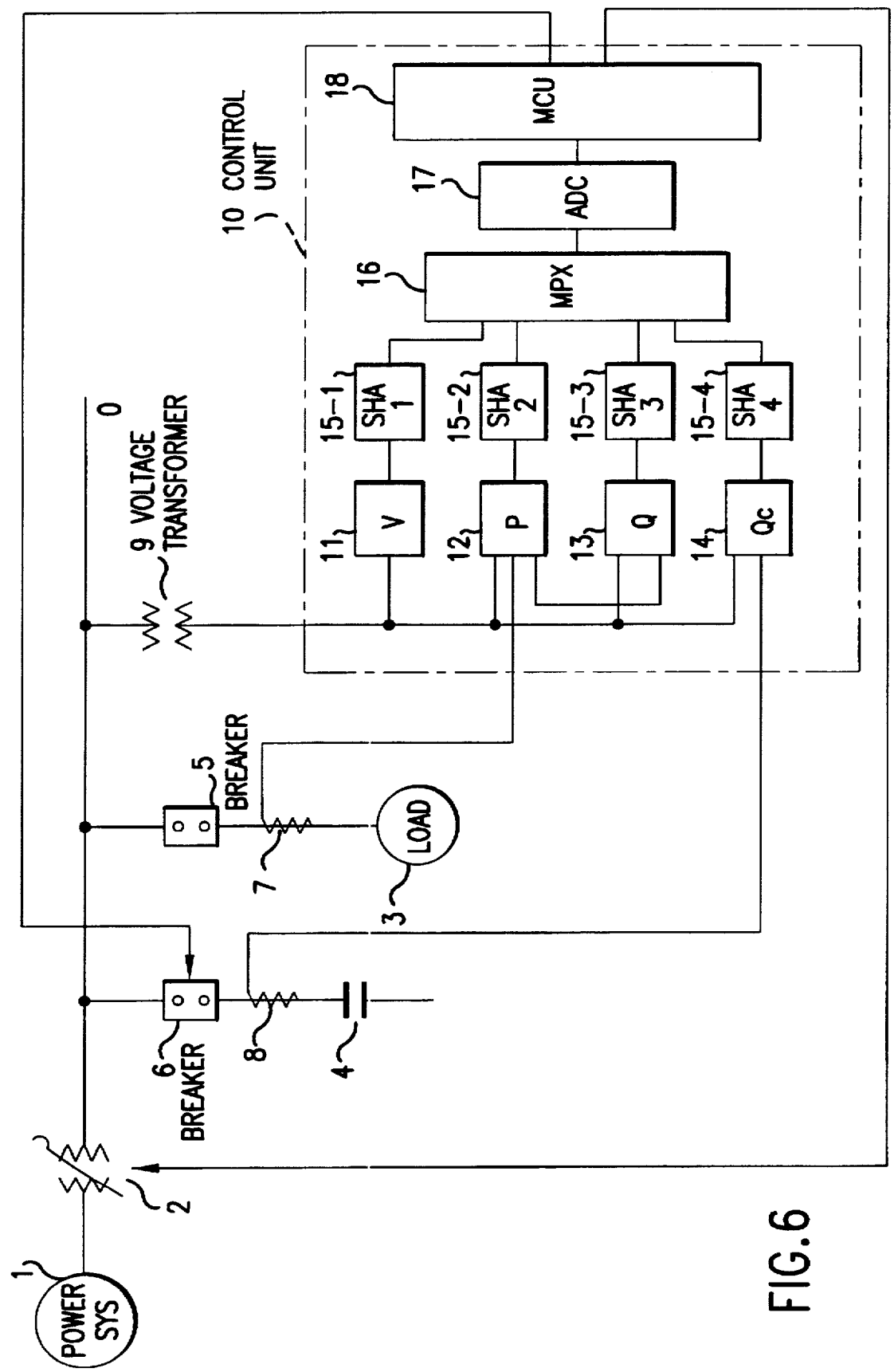
FIG. 6 is a block diagram showing a load management and control apparatus according to the embodiment 1 of the present invention.

FIG. 6 is a block diagram showing a load management and control apparatus according to the embodiment 1 of the present invention. In the drawing, reference numeral 0 represents a bus connected to the load to be managed by the apparatus, 1 is a power system to supply power to the load, and 2 is a transformer having a tap changer (a voltage adjusting unit) interconnecting the power source with the load. Further, reference numeral 3 represents the load, 4 is a capacitor provided with a reactive power supply unit to improve a power factor of the load 3, 5 is a breaker to interrupt power supply to the load 3, 6 is another breaker to use or omit the reactive power supply unit 4, 7 and 8 are current transformers to measure current of the load 3 and the reactive power supply unit 4 respectively, and 9 is the voltage transformer to measure voltage of the bus 0.

Reference numeral 10 represents a control unit including the following component parts. Reference numerals 11 to 14 represent transducers to yield dc voltage by introducing bus voltage, active power and reactive power of the load, and reactive power of the reactive power supply unit 4, respectively. Reference numerals 15-1, 15-2, 15-3, and 15-4 represent sample-and-hold amplifiers to track and hold output from the transducers 11 to 14. Reference numeral 16 represents a multiplexer in which the output from the sample-and-hold amplifiers 15-1, 15-2, 15-3, and 15-4 are sequentially switched to be fed into the A/D converter 17. The A/D converter 17 produces a digital data value output corresponding to analog voltage, i.e., output from the multiplexer 16. Reference numeral 18 represents a microcontroller including a built-in I/O port and a built-in memory to make an arithmetic operation, comparison and decision. A commercially available microcontroller is sufficiently practical for the purpose. Output from the microcontroller is fed to the tap-changing transformer 2 having the tap changer as the command for the tap changing operation thereof, or is fed to the breaker 6 for the reactive power supply unit 4 as the command for switching operation of the breaker 6.

Figure 7:
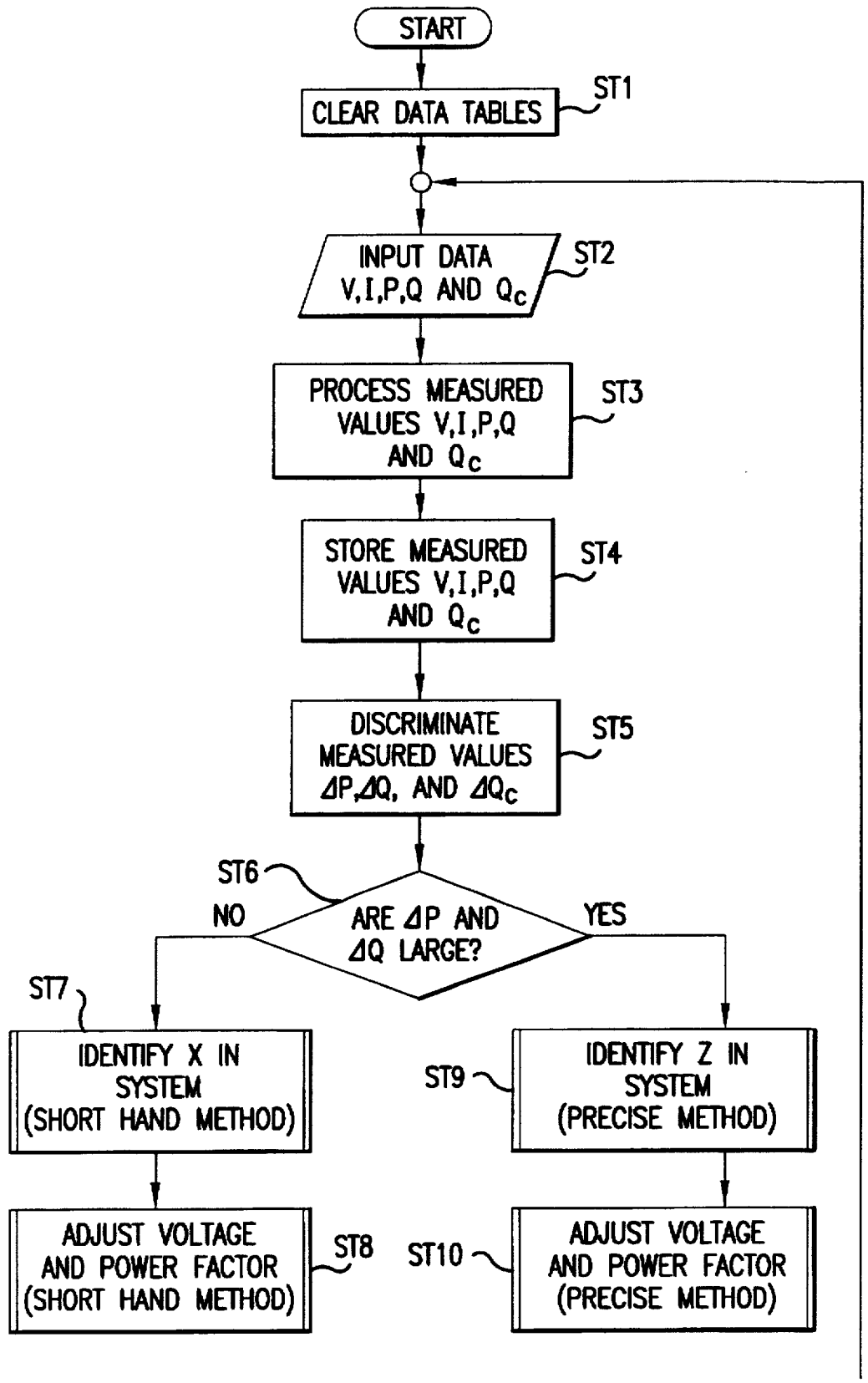
FIG. 7 is a flowchart illustrating the operation in the embodiment 1.

A description will now be given of the operation in the embodiment 1 referring to the flowchart of FIG. 7. In FIG. 7, data in a data bank is cleared when the apparatus starts (in Step ST1). Subsequently, measured values V, I, P, Q, and $Q_c$ at a load point are introduced to convert the value to industrial unit and find the integral values, the mean values, the effective values and so forth from the measured values. In particular, with respect to the values V and I, instantaneous values are collected to create matrix data as used in higher harmonics management or the like (in Steps ST2 to ST4). Data are appropriately picked up from the stored matrix data to find finite difference ($\Delta P$, $\Delta Q$, and $\Delta Q_c$) with respect to predetermined operation reference values (in Step ST5). Then it is decided whether or not the variation of power fed from the system to the load exceeds a predetermined value (in Step ST6). If the variation does not exceed the value, THE identification and adjustment are made by the short-hand method (in Steps ST7 and ST8). Otherwise, if the variation of the power fed from the system to the load exceeds the predetermined value, the identification and adjustment are made by the precise method (in Steps ST9 and ST10).

Figure 8:
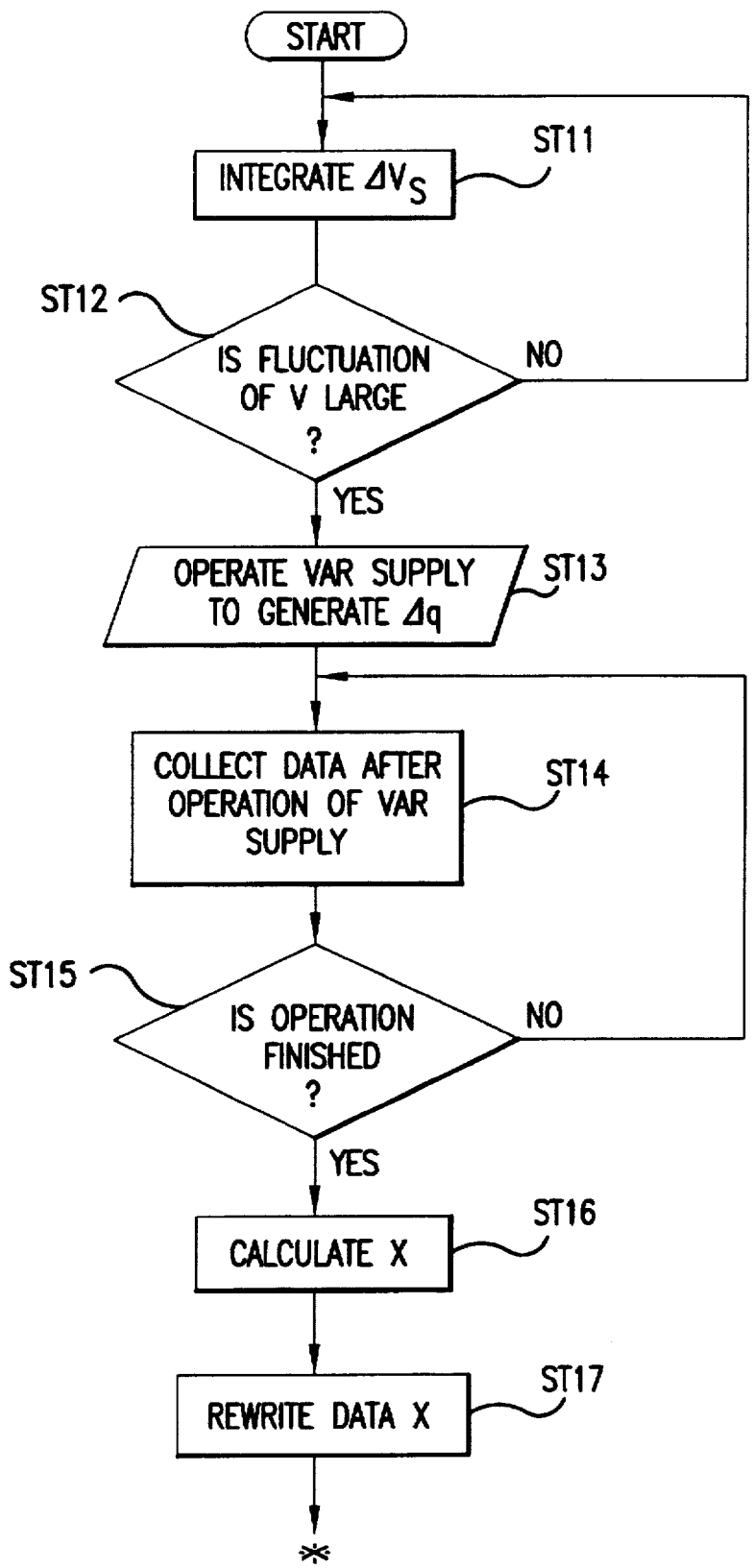
FIG. 8 is a flowchart illustrating identification and adjusting operation based on the short-hand method.
Figure 9:
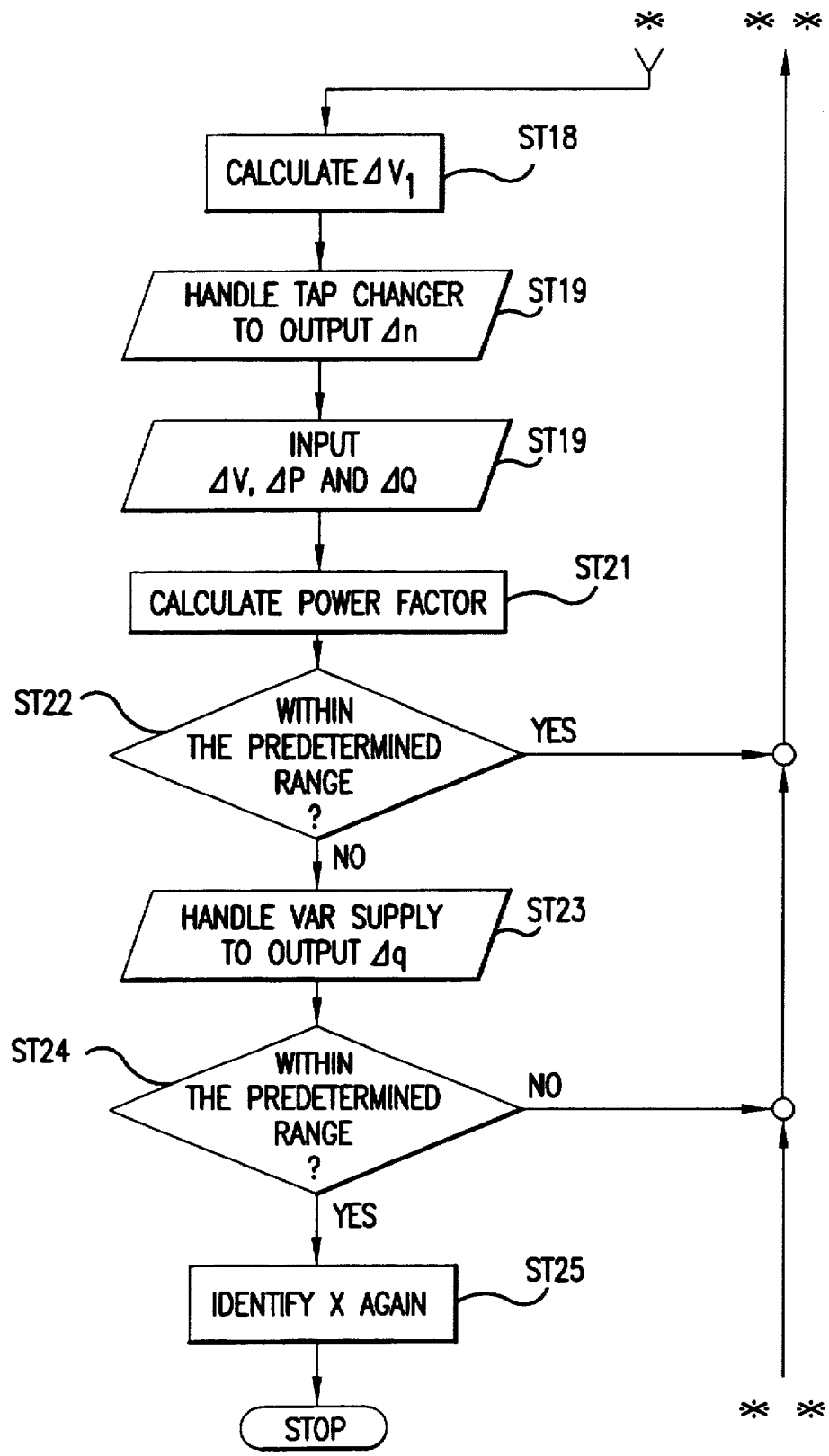
FIG. 9 is a flowchart illustrating the identification and the adjusting operation based on the short-hand method.

A description will now be given of the concrete procedure for the identification and the adjustment by the short-hand method referring to the flowcharts of FIGS. 8 and 9. First, according to the flowchart of FIG. 8, an integral value of voltage deviation for an appropriate period is calculated. When the integral value of voltage exceeds a predetermined value, it can be considered that a state of the system is changed. Then, the reactive power $\Delta q$ is supplied from the reactive power supply unit (VAR) 4 (in Steps ST11 to ST13). When the reactive power is supplied, the following relationship, which is the same as the expressions (3.1) and (3.2), is established between the finite difference ($\Delta V$) of the voltage V and that ($\Delta Q$) of the reactive power Q of the input side of the load system.

$$\Delta V = \Delta V_1 + \Delta n - X \bullet \Delta q \qquad (6.1)$$

$$\Delta Q = -\Delta q \qquad (6.2)$$

Figure 10:
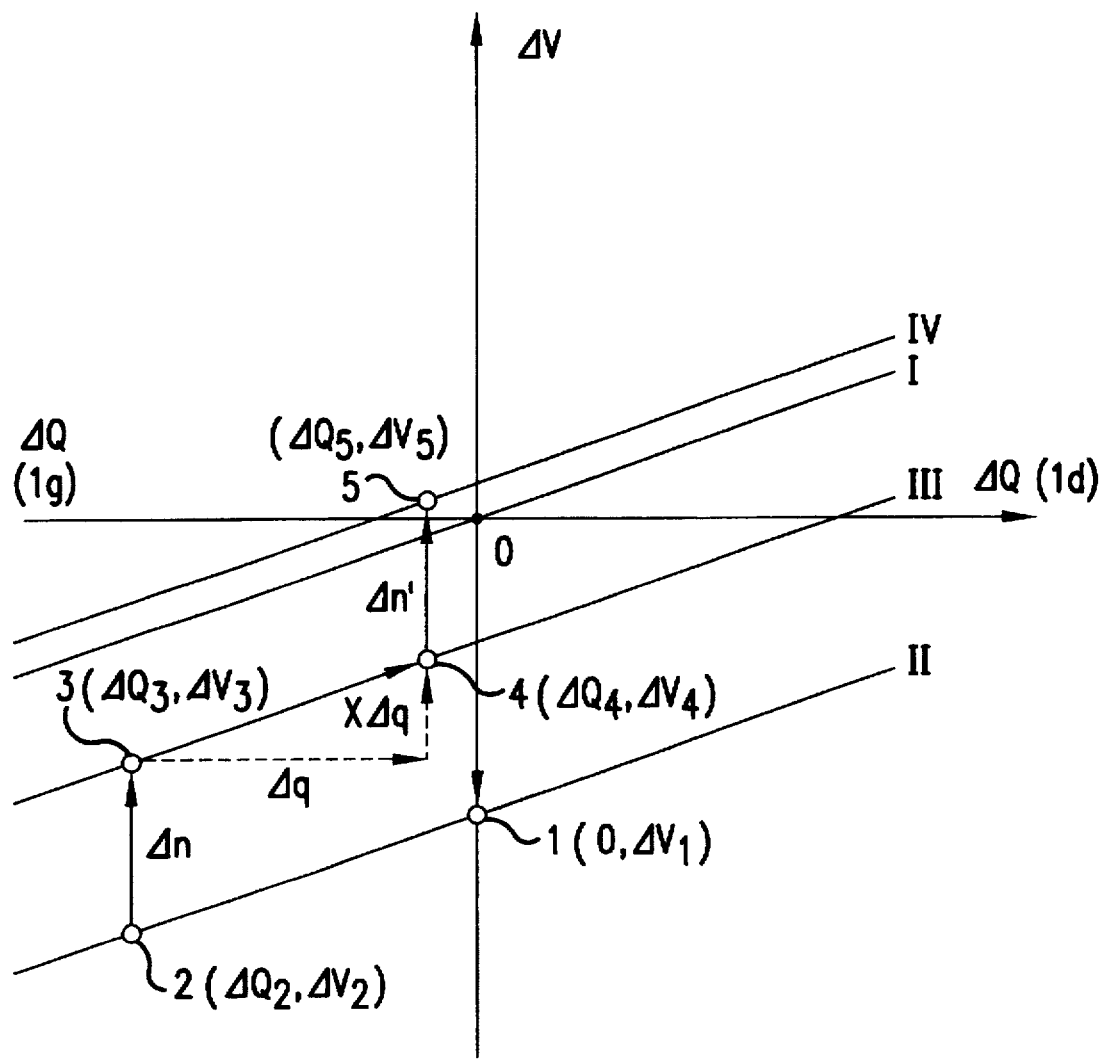
FIG. 10 is a $\Delta Q$–$\Delta V$ diagram illustrating the adjustment of the voltage and the power factor based on the short-hand method.

FIG. 10 shows the trace of changes of $\Delta V$ and $\Delta Q$ satisfying the above equations on the $\Delta V$–$\Delta Q$ plane. In FIG. 10, when the reactance X behind the system is known, it is possible to determine the slope of group of straight lines I, II, III, and IV. Unlike other lines, the straight line I intersects the origin. Next, when driving voltage behind the reactance X of the power source is varied by $\Delta V_1$, the straight line I is moved by $\Delta V_1$ in parallel with the ordinate axis, i.e., to the $\Delta V$ axis. That is, when the driving voltage behind power source is varied by $\Delta V_1$ in a voltage reducing direction, a variation of the reactive power $\Delta Q$ at this point is as shown by the straight line II. Further, if a tap n of the tap changer is changed by $\Delta n$, the straight line II is moved by $\Delta n$ in parallel along the $\Delta V$ axis, laps the straight line III. Namely, the tap change $\Delta n$ of the tap changer of the transformer (LRT) may serve to carry out fine control of the voltage. Thus, the operating point is moved vertically from a point 2 ($\Delta Q_2$, $\Delta V_2$) to a point 3 ($\Delta Q_3$, $\Delta V_3$).

On the other hand, when the power factor is far from the predetermined value in this state, the power factor can be improved by generating $\Delta q$ of the reactive power supplied from the reactive power supply unit. That is, the point 3 ($\Delta Q_3$, $\Delta V_3$) is moved to a point 4 ($\Delta Q_4$, $\Delta V_4$) after movement on the straight line III by $\Delta q$ on quadrature axis. If the voltage is still too low after the above power-factor improvement, the tap n is changed to generate $\Delta n'$ so as to bring the straight line III up to lap the straight line IV. Thus, the point 4 ($\Delta Q_4$, $\Delta V_4$) is moved to a point 5 ($\Delta Q_5$, $\Delta V_5$). As a whole, the tap change $\Delta n$ moves the voltage in the $\Delta V$ axis direction, and the change $\Delta q$ moves the reactive power $\Delta Q$ along the axial direction, thereby moving the straight line III up to a position to cancel out $\Delta V$ change depending upon a variation in the active power. That is, it is possible to carry out the adjustment of the voltage by the variation $\Delta n$ and the adjustment of the power factor by the variation $\Delta q$ independently with each other.

In the above adjustments, it is necessary to know the reactance X of the system in order to estimate the amount of the variation $\Delta q$ which should be adjusted to set the value $\Delta V$ to a desired value together with improving the power factor at the same time.

When the reactive power q supplied from the reactive power supply unit is varied by $\Delta q$, the following relation exists as long as the driving voltage behind the system does not vary.

$$(\Delta V)_q = -X \bullet \Delta q \qquad (6.3)$$

$$(\Delta Q)_q = -\Delta q \qquad (6.4)$$

From these relations, the reactance X of the system can be written as the following expression (in Steps ST14 to ST16).

$$X = (\Delta V)_q / (\Delta Q)_q \qquad (6.5)$$

Then old data of X is replaced by the new one (in Step ST17). By determining the reactance X, it is possible to determine the voltage variation $\Delta V_1$ behind the system reactance X according to the expression (6.1). Thus, the variation ($\Delta n$) of the tap may be generated so as to be equal to the voltage variation $\Delta V_1$. After the tap is changed, the values $\Delta V$, $\Delta P$, and $\Delta Q$ are measured to calculate the power factor (in Steps ST18 to ST21). Subsequently, it is decided whether or not the power factor is in a predetermined range (in Step ST22). If the power factor is out of the predetermined range, the reactive power supply unit 4 is operated to generate the change Δq so as to improve the power factor depending upon the margin of var supply equipment capacity. When the power factor measured again is in the predetermined range, the reactance X of the system is estimated again to quit the operation (in Steps ST23 to ST25).

Figure 11:
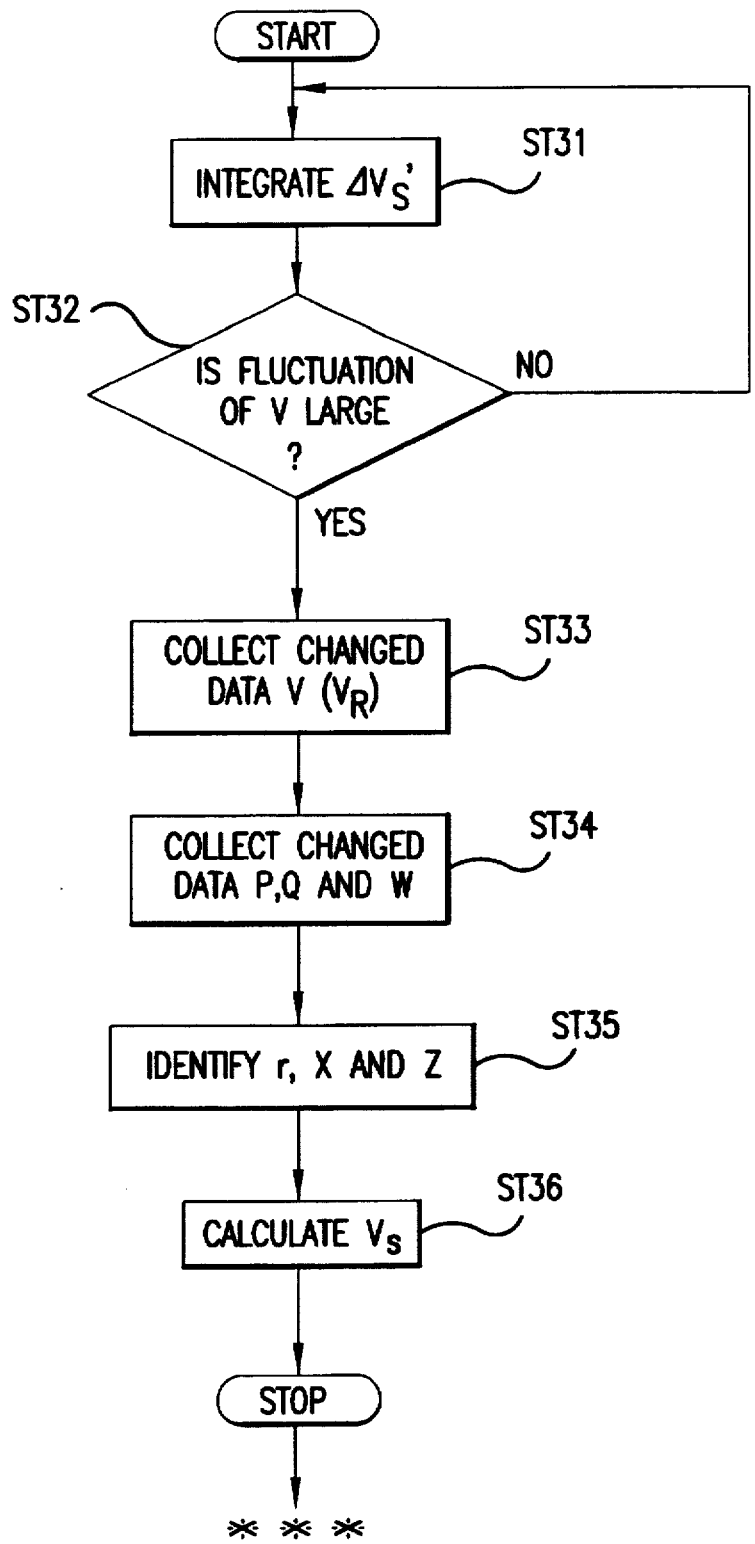
FIG. 11 is a flowchart illustrating identification and adjustment operation based upon the precise method.
Figure 12:
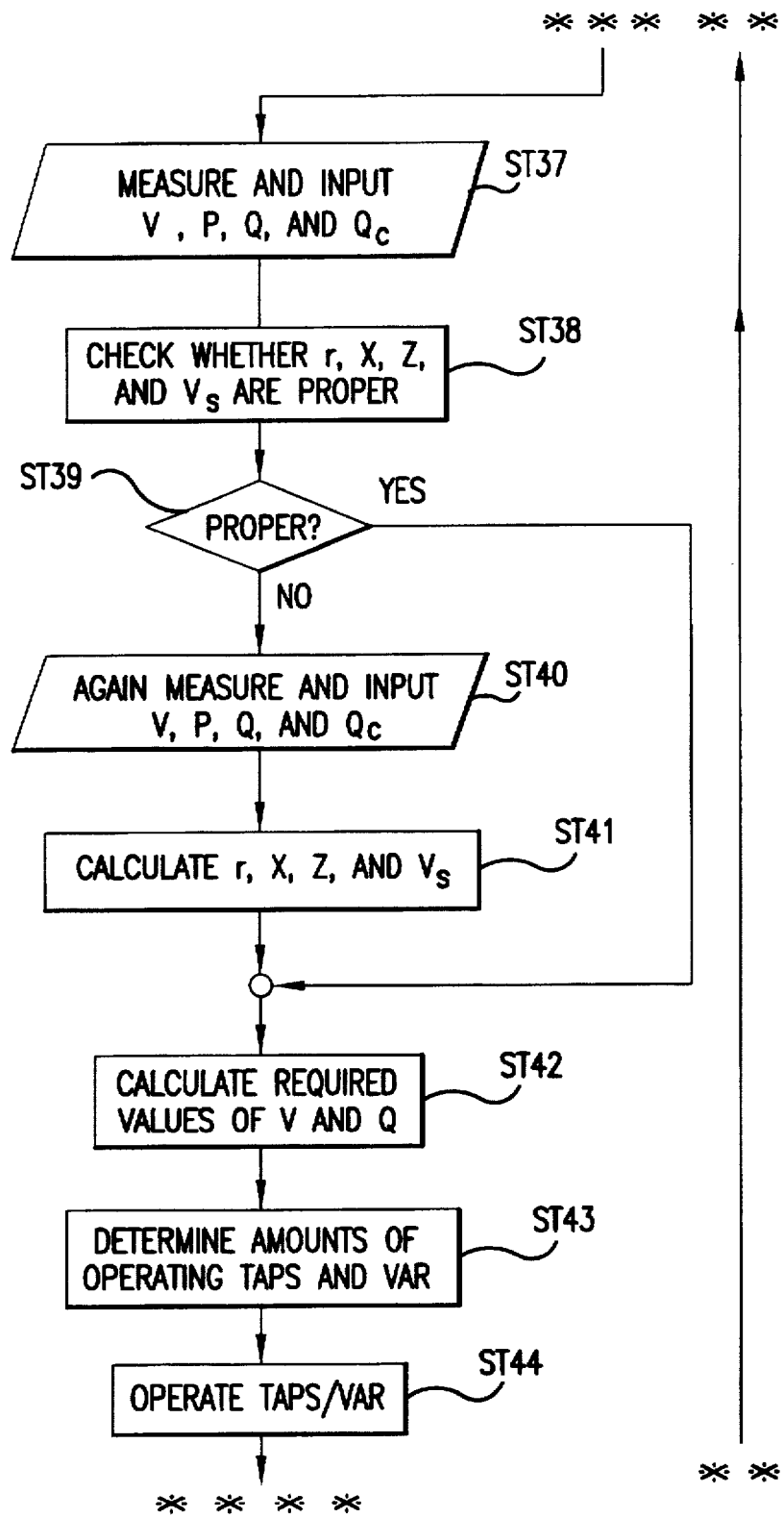
FIG. 12 is a flowchart illustrating the identification and the adjusting operation based upon the precise method.
Figure 13:
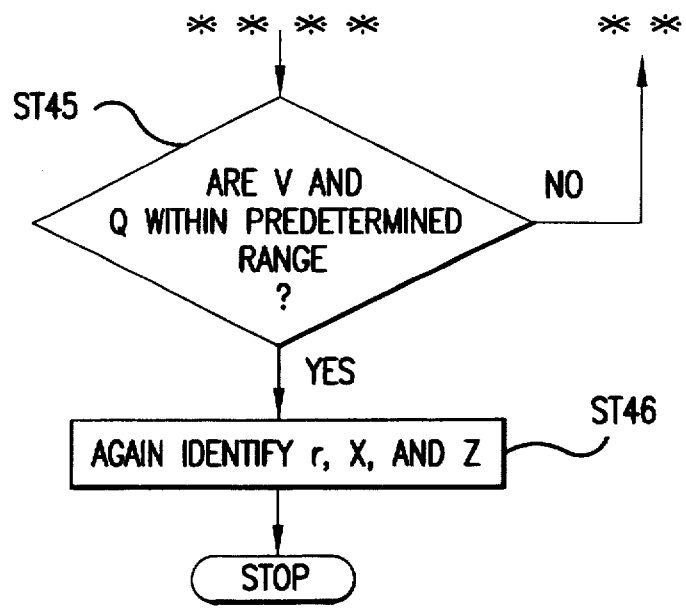
FIG. 13 is a flowchart illustrating the identification and the adjusting operation based upon the precise method.

A description will now be given of concrete procedure for the identification and the adjustment according to the precise method following up result of Step ST6, referring to flowcharts of FIGS. 11 and 12. In FIG. 11, an integral value of the voltage deviation for an appropriate period is found (in Step ST31). It is decided whether or not the voltage variation exceeds a predetermined value (in Step ST32). When the integral value is so large as to recognize the change in the system voltage, it can be considered that some variation is generated in the system or the load. Consequently, the group of data of the voltage, the active power, and the reactive power are stored to carry out appropriate integration so as to establish two sets of data of the voltage, the active power, and the reactive power (in Steps ST33 and ST34). On the other hand, the reactance value X determined according to the formula (6.5) is compensated and acknowledged by the result obtained after the following procedure. Rewriting formula (3.3), the next formula is obtained:

$$V_S^2 = \frac{W^2}{V_R^2}\left(r+\frac{PV_R^2}{W^2}\right)^2 + \frac{W^2}{V_R^2}\left(x+\frac{QV_R^2}{W^2}\right)^2 \quad (7.1)$$

It is assumed that the load is varied while the power source voltage is kept constant, and two sets of voltage and power flows are observed at the two time points. In this case, the following expression can be obtained by adding two suffixes of 1 and 2:

$$\begin{aligned}V_{S1}^2 &= \frac{W_1^2}{V_{R1}^2}\left(r+\frac{P_1V_{R1}^2}{W_1^2}\right)^2 + \frac{W_1^2}{V_{R1}^2}\left(x+\frac{Q_1V_{R1}^2}{W_1^2}\right)^2 \\ &= \frac{W_2^2}{V_{R2}^2}\left(r+\frac{P_2V_{R2}^2}{W_2^2}\right)^2 + \frac{W_2^2}{V_{R2}^2}\left(x+\frac{Q_2V_{R2}^2}{W_2^2}\right)^2\end{aligned} \quad (7.2)$$

$$\left(\left(\frac{W_1}{V_{R1}}+\frac{W_2}{V_{R2}}\right)r+\left(\frac{P_1V_{R1}}{W_1}+\frac{P_2V_{R2}}{W_2}\right)\right)* \quad (7.3)$$

$$\left(\left(\frac{W_1}{V_{R1}}r+\frac{P_1V_{R1}}{W_1}\right)-\left(\frac{W_2}{V_{R2}}r+\frac{P_2V_{R2}}{W_2}\right)\right)+$$

$$\left(\left(\frac{W_1}{V_{R1}}+\frac{W_2}{V_{R2}}\right)x+\left(\frac{Q_1V_{R1}}{W_1}+\frac{Q_2V_{R2}}{W_2}\right)\right)*$$

$$\left(\left(\frac{W_1}{V_{R1}}x+\frac{Q_1V_{R1}}{W_1}\right)-\left(\frac{W_2}{V_{R2}}x+\frac{Q_2V_{R2}}{W_2}\right)\right)=0$$

When the above equation (7.2) is solved to find solutions other than r=0, and X=0, $$r = \frac{P_1V_{R1}/W_1 - P_2V_{R2}/W_2}{W_1/V_{R1} - W_2/V_{R2}} \quad (7.4)$$

Solving the above for r and X, $$x = \frac{Q_1V_{R1}/W_1 - Q_2V_{R2}/W_2}{W_1/V_{R1} - W_2/V_{R2}} \quad (7.5)$$

By using the above found values (r, X), it is possible to find more accurate impedance Z behind the system. Further, in order to adjust the voltage by using the impedance Z, it is necessary to find improvement factor of voltage as follows:

$$\Delta V_{R-P} = -\frac{Z^2P+rV_R^2}{V_R^4 - Z^2W^2}\Delta P \quad (7.6)$$

$$\Delta V_{R-Q} = -\frac{Z^2Q+xV_R^2}{V_R^4 - Z^2W^2}\Delta Q \quad (7.7)$$

From the above formula, it is possible to directly find the improvement factor of voltage due to variations of the values P and Q.

By using the impedance determined as above, the power source side driving voltage $V_S$ is also found (in Steps ST35 and ST36). As the result of the decision in Step ST32, when it is decided that the variation of the voltage is excessively large, tap changers or reactive power supply equipments must be operated by this method. In this case, measurements are made on the voltage, the active power, and the reactive power to check the values r, X, Z, and $V_S$ (in Steps ST37 and ST38). As the result of the check, if the values are improper, the measurements are again made on the voltage, the active power, and the reactive power. As in the above steps, the values r, X, Z, and $V_S$ are estimated once again (in Steps ST39 to ST41).

Depending upon the values r, X, and Z estimated as above, and the currently measured values of the voltage, the active power, and the reactive power, the two formulas (7.6) and (7.7) are defined as to yield the correct estimation of the variations ($\Delta V_R$, $\Delta P$, and $\Delta Q$) of the voltage, the active power, and the reactive power. In this case, if one of the variations is fixed, the remaining two variations can uniquely be determined. Since the variation in the active power is typically fixed by requirements from the load, the two variations $\Delta V_R$ and $\Delta Q$ can be determined using the two formulas (in Step ST42). Consequently, it is possible to determine the required control amounts of the tap and the reactive power to provide the variations $\Delta V_R$ and $\Delta Q$. The tap of the LRT transformer and the reactive power supply unit are determined on the basis of the above required control amounts (in Steps ST43 and ST44). When the changes ($\Delta V_R$, $\Delta Q$) are in the predetermined ranges after the control, the values r, X, and Z of the system are estimated once again to finish the process. If the changes are out of the predetermined ranges, the process returns to the initial step for measuring the voltage, the active power, and the reactive power.

A description will now be given of the higher harmonics management. As set forth above, the guideline is set to avoid the effects of the higher harmonics pumped up from the load to the source side of the system. For this purpose, it is necessary to know the ratio of the load capacity connected to the system and a system short-circuit capacity so as to carry out appropriate suppressing operation on each of the load sides. The reactance X of the system should be found by the connection or the disconnection of the reactive power supply unit. In case of the reactive power supply unit such as a capacitor being used, the reactance X of the system is available to find values $I_{SC}$ and $I_L$ as follows:

$$I_{SC} = E/X$$

$$I_L = W/E$$

Thus, it is possible to use, as the threshold of allowable harmonics current content, values given by the following expressions:

| | | |
|---|---|---|
| $E^2/WX < 20$ | $THD_{MAX} = 5.0\%$ | (8.1) |
| $20 < E^2/WX < 50$ | $THD_{MAX} = 8.0\%$ | (8.2) |
| $50 < E^2/WX < 100$ | $THD_{MAX} = 12.0\%$ | (8.3) |
| $100 < E^2/WX < 1000$ | $THD_{MAX} = 15.0\%$ | (8.4) |
| $E^2/WX < 1000$ | $THD_{MAX} = 20.0\%$ | (8.5) | where E being system operating voltage.

Further, there may be provided no reactive power supply unit, or the value X/R of the system is not so large since a load system is disposed in the vicinity of network termination. In such a case, the impedance Z may be found by using the values r and X estimated according to the precise method mentioned before, and may be employed instead of the reactance X.

Figure 14:
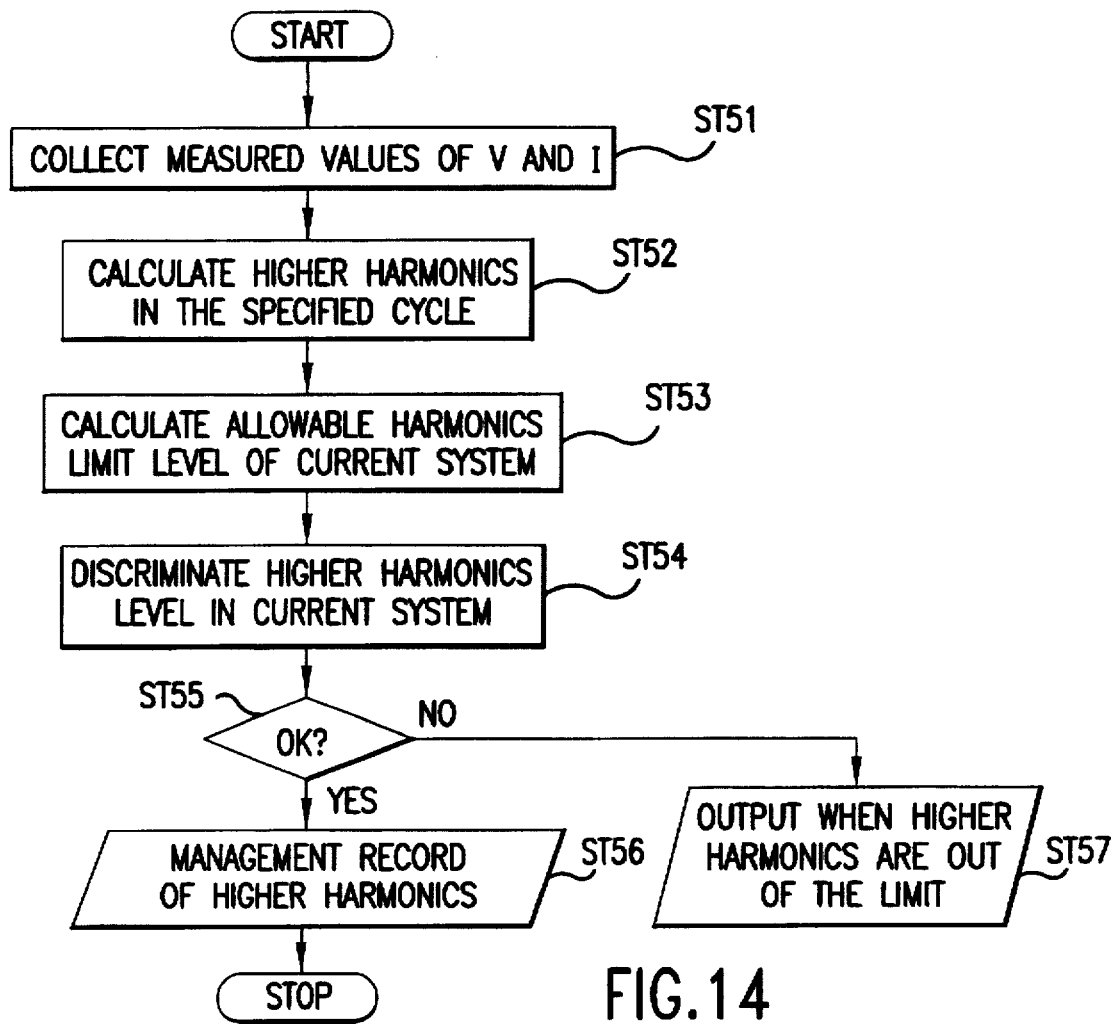
FIG. 14 is a flowchart illustrating the procedure for managing the higher harmonics.

A description will now be given of procedure for higher harmonics management referring to the flowchart of FIG. 14. The higher harmonic suppression does not require as rapid control as the adjustment of the voltage and the reactive power required, and unique management standard is established for the higher harmonics as specified in the IEEE standard. Hence, voltage data and current data required for the processing are discretely collected from data already stored in the data bank (in Step ST51). Depending upon the data, the calculation is carried out to obtain the Fourier components from the data (up to substantially the fortieth order thereof) for a specific period. This method is disclosed in detail in various related publications of the Fourier analysis (as in Step ST52). As set forth above, the allowable level of the higher harmonics is varied according to the ratio of the short-circuit capacity of the system and that of the load. Thus, short-circuit capacity of the current system is calculated depending upon the reactance X or the impedance Z in the data bank. Subsequently, after the current load is confirmed, a current allowable limit is calculated (according to the expressions (8.1) to (8.5)) (in Step ST53).

According to the expressions (8.1) to (8.5), it is decided whether or not a higher harmonic component of the current system is within a range. If the higher harmonic components are within the range, measured values of the respective higher harmonic components are recorded for storage. Otherwise, if out of the range, an alarm is uttered to indicate that limit is exceeded. The alarm includes information sent to the external plants or external organizations (in Steps ST54 to ST57).

Since the management procedure for managing and suppressing the higher harmonics depends upon each site, a detailed description thereof is omitted. Briefly, the management is performed by deciding whether or not the above allowable levels are met which are obtained in consideration of a state of the system side and an operation state of the load side, resulting in reasonable and precise management. As a result, even in a system including the load to generate the higher harmonics, it is possible to carry out the management according to the guideline in which reasonable investigation is made on the effect of the higher harmonics on a higher level system side. That is, it is possible to reasonably control higher harmonics' distribution with out, where higher harmonics are pumped up into the system, setting excessively severe suppression standards on the load side.

Embodiment 2

Figure 15:
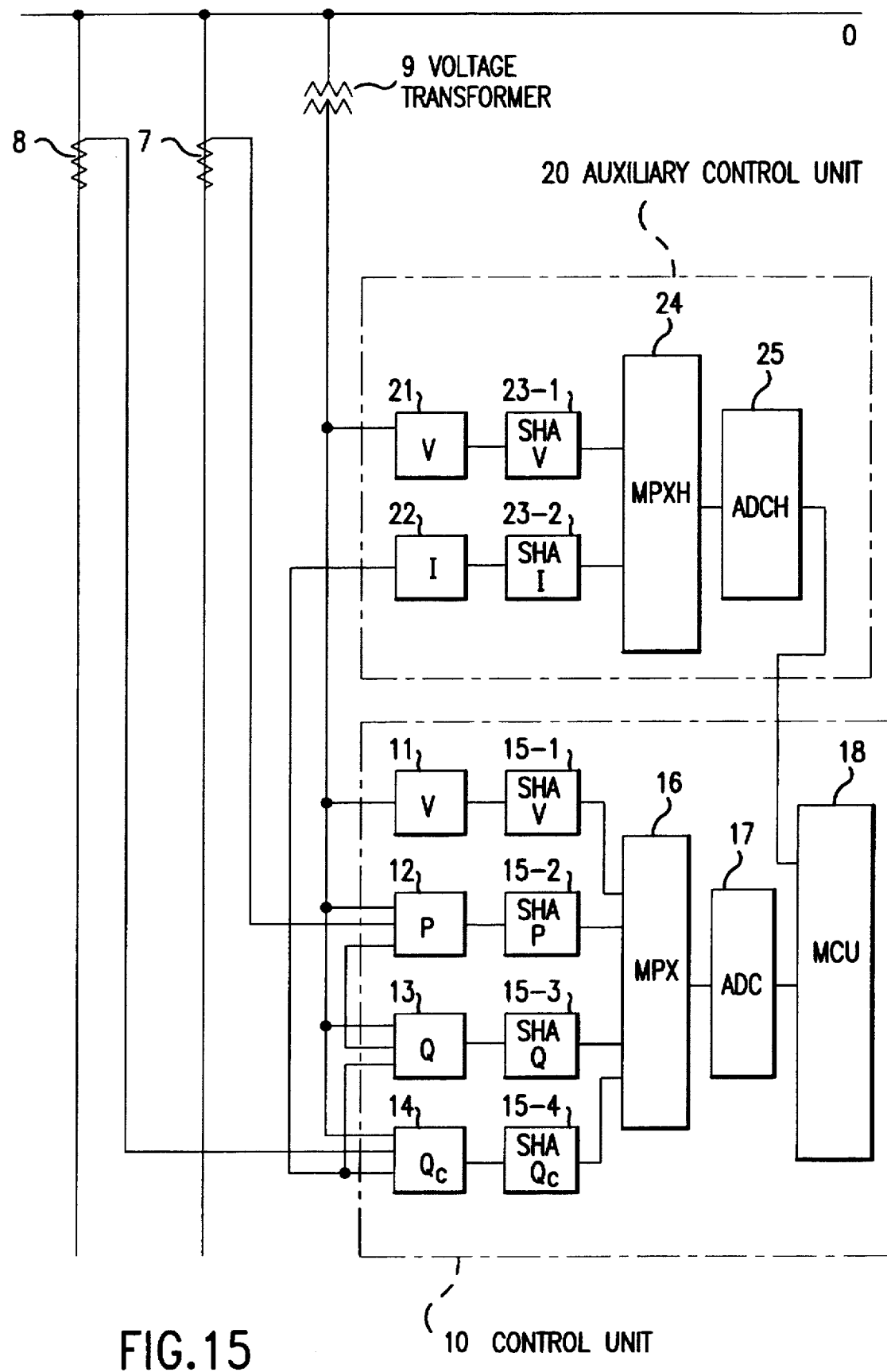
FIG. 15 is a block diagram showing the load management and control apparatus according to the embodiment 2 of the present invention.

FIG. 15 is the block diagram showing the load management and control apparatus according to the embodiment 2 of the present invention. The same reference numerals are used for component parts identical with those in the embodiment 1 shown in FIG. 6, and descriptions thereof are omitted. In the drawing, reference numeral 20 means an auxiliary control unit receiving input partially shared with a control unit 10 and including the following component parts. Reference numeral 21 means a voltage transducer receiving input from the voltage transformer 9, 22 is a current transducer receiving input from the current transformer 7, 23-1 and 23-2 are sample-and-hold amplifiers receiving input from the voltage transducer 21 and the current transducer 22, and 24 is the multiplexer in which output from the sample-and-hold amplifiers 23-1 and 23-2 are sequentially switched over to be fed into an A/D converter 25. The A/D converter 25 includes registers in which the converted digital data is temporally stored to be fed into a microcontroller 18.

Though the operation in the embodiment 2 is logically identical with that in the embodiment 1, the embodiments differ from the above in timing of collection of input data (in Step ST2) as shown in FIG. 7. Consequently, processing and storage in the subsequent steps are triggered at the time points different from the time points in FIG. 7. Naturally, in the detailed discussion, there is another difference in the starting logic for collection of the measured values V and I (in Step ST51) in FIG. 14.

According to the embodiment 2, since the separate hardware are employed to input data including system voltage and current, it is possible to freely set input timing or collection timing. That is, it is possible to avoid concurrent operation of the adjustment of the voltage or the power factor and the data collection for the higher harmonics management, resulting in facilitating the collection, the storage, and the processing.

As stated above, according to the first aspect of the present invention, the system reactance is estimated by using the variations in the voltage and the reactive power of the system upon the operation of tap changers or reactive power supply unit. The estimated system reactance is used to carry out the control operation while establishing the unique relationship between the changing operation of the tap of the LRT transformer and the connection or disconnection operation of the reactive power supply unit so as to set the voltage and the power factor of the system receiving side in the desired ranges. As a result, there are effects in that frequent operation of the tap can be prevented, and the voltage of the system load side can be adjusted not only to reduce the voltage deviation but also to provide the overall and reasonable management, including the power-factor, for the supply and distribution of the reactive power of the load system.

Further, according to the second aspect of the present invention, the system impedance is estimated by using the variations of the voltage, the active power, and the reactive power of the load. The estimated system impedance is used to carry out the control operation while establishing the unique relationship between the operation of the tap of the LRT transformer and the connection or disconnection operation of the reactive power supply unit so as to provide the desired relationship between the voltage, the active power, and the reactive power of the system receiving side. As a result, there are effects in that frequent operation of the tap changer can be prevented, and the voltage of the load system can be adjusted not only to overcome the voltage deviation or improve the power factor but also to provide the overall and reasonable management for the supply and distribution of the reactive power of the load while taking account of the voltage variation depending upon the load variation adapting to the current system capacity, that is, the short-circuit capacity.

Further, according to the third aspect of the present invention, the alarm is uttered to provide the information about triggering of a higher harmonic suppressing apparatus and the reactive power supply unit. As a result, there is an effect in that suppression and management of the higher harmonics can be made to reduce the influence of the higher harmonics upon the total system.

While preferred embodiments of the invention have been described using specific terms, such description is for illustrative purposes only, and it is to be understood that changes and variations may be made without departing from the spirit or scope of the following claims.

What is claimed is:

1. A load management and control apparatus installed in a receiving end substation, comprising:

a transformer having a tap changer and being connected between a load bus and a source of power;

a voltage adjusting unit for adjusting a tap of the transformer;

a reactive power supply unit connected to said load bus; and a control unit for controlling connection or disconnection of said reactive power supply unit from said load bus and for changing said tap of said transformer, and including means for detecting active power and reactive power in addition to a detection of system voltage, means for varying the system voltage and a power flow state by the connection or disconnection of the reactive power supply unit, means for estimating system reactance by using the resultant variations in the voltage and the reactive power, and means for carrying out control operation by using the estimated system reactance and establishing a relationship between the tap changing operation of the transformer and the connection or disconnection operation of the reactive power supply unit for setting the voltage and power factor of the system receiving side within desired ranges.

2. A load management and control apparatus installed in a receiving end substation, comprising:

a transformer having a tap changer and being connected between a load bus and a source of power;

a voltage adjusting unit for adjusting a tap of the transformer;

a reactive power supply unit connected to said load bus; and a control unit for controlling connection or disconnection of said reactive power supply unit from said load bus and for changing said tap of said transformer, and including means for detecting active power and reactive power in addition to a detection of system voltage, means for monitoring and detecting variations in the active power, the reactive, and the voltage, means for estimating impedance, and to confirm variations in system properties by using the system variations means for carrying out control operation by using the estimated impedance while establishing a unique relationship between the tap changing operation of the transformer and the connection or disconnection operation of the reactive power supply unit; and means for establishing desired relationships between voltage, the active power, and the reactive power of the receiving side system.

3. A load management and control apparatus installed in a receiving end substation, comprising:

a transformer having a tap changer and being connected between a load bus and a source of power;

a voltage adjusting unit for changing a tap of the transformer;

a reactive power supply unit connected to said load bus; and a control unit for controlling connection or disconnection of said reactive power supply unit from said load bus and for changing said tap, and including means for measuring and monitoring higher harmonic voltage or current, means for using the system reactance estimated using variations in voltage and reactive power or the system impedance estimated using variations in voltage, active power and reactive power, means for carrying out control operation and establishing a relationship between the tap changing operation of the transformer and the connection or disconnection operation of the reactive power supply unit, means for setting the voltage and power factor of the system receiving side within desired ranges, means for comparing system short-circuit capacity with magnitude of a load power flow, means for automatically setting the reduction level of higher harmonics in the current system, and means for sending, externally to the apparatus, information about conditions or operation to activate an adjacent higher harmonics reducing apparatus and the reactive power supply unit.

* * * * *

UNITED STATES PATENT AND TRADEMARK OFFICE
CERTIFICATE OF CORRECTION

PATENT NO. : 5,798,634
DATED : August 25, 1998
INVENTOR(S) : Makoto Terada et al.

It is certified that error appears in the above-identified patent and that said Letters Patent is hereby corrected as shown below:

<u>Column 5,</u>
Line 29, "r-Jx" should be --r-jX--.

<u>Column 9,</u>
Lines 35-40, in formula (7.2), all "$V^2_{s1}$" components should be changed to -- $V_{s1}^2$ --;
all "$V^2_{R1}$" components should be changed to -- $V_{R1}^2$ --;
all "$V^2_{R2}$" components should be changed to -- $V_{R2}^2$ --;

<u>Column 11,</u>
Lines 2-6, in the table, insert a colon before "$THD_{MAX}$".

Signed and Sealed this

Seventeenth Day of July, 2001

*Attest:*

NICHOLAS P. GODICI
*Attesting Officer*    *Acting Director of the United States Patent and Trademark Office*